United States Patent
Reed

(10) Patent No.: US 7,373,127 B2
(45) Date of Patent: May 13, 2008

(54) DIGITAL BEAM FORMING FOR COMMUNICATIONS SYSTEMS

(75) Inventor: John C. Reed, Port Hueneme, CA (US)

(73) Assignee: Delphi Technologies, Inc., Troy, MI (US)

( * ) Notice: Subject to any disclaimer, the term of this patent is extended or adjusted under 35 U.S.C. 154(b) by 457 days.

(21) Appl. No.: 11/115,721

(22) Filed: Apr. 27, 2005

(65) Prior Publication Data

US 2006/0246863 A1    Nov. 2, 2006

(51) Int. Cl.
*H04B 1/06* (2006.01)
(52) U.S. Cl. ............ 455/259; 455/265; 455/273; 455/276.1
(58) Field of Classification Search ........... 455/255, 455/259–260, 265, 303, 323, 324, 272, 273, 455/257, 276.1; 375/327
See application file for complete search history.

(56) References Cited

U.S. PATENT DOCUMENTS 5,870,670 A * 2/1999 Ripley et al. .............. 455/304
7,116,728 B2 * 10/2006 McCune, Jr. .............. 375/324
2002/0123316 A1 * 9/2002 Sih et al. .................. 455/245.1
2003/0181187 A1 * 9/2003 Liu ........................... 455/302
2005/0143043 A1 * 6/2005 Kerth ........................ 455/334

* cited by examiner

*Primary Examiner*—Nguyen Vo
(74) *Attorney, Agent, or Firm*—Jimmy L. Funke

(57) ABSTRACT

An antenna-receiver communications system and method is provided to mechanize multibeam mobile antenna-receive subsystems. Digital beam forming for modern wideband mobile communications systems is provided. In an aspect, subsystems can simultaneously receive, acquire, track and output a multiplicity of signals from sources of different locations using a single antenna aperture from a mobile platform. The angle of arrival of a signal of interest is continuously determined. Individual phased array antenna output channels are phased aligned as required by the phased array equation and monopulse signal processing. Angle sensing and beamsteering are separated from antenna channel coherent summation. Thus, the angle sensing and beamsteering functions are not required to be computed at the data rate, but can instead be computed at a rate necessary for the beam acquisition and beam tracking function speed requirements. Signal processing computational load and system cost is reduced as compared to current systems.

21 Claims, 14 Drawing Sheets

DIGITAL BEAM FORMING FOR COMMUNICATIONS SYSTEMS

FIELD OF THE INVENTION

The invention relates generally to communication antenna-receivers, and more particularly to digital beam forming for wideband mobile communications systems.

BACKGROUND OF THE INVENTION

In a stationary antenna and receiver, the antenna boresight is mechanically pointed at a communications transmitter source. As an example, in a Direct Broadcast Satellite (DBS) TV service having a receiver terminal with an 18 inch parabolic dish antenna, the antenna is pointed by mechanical means at a geostationary broadcasting satellite.

In a mobile antenna-receiver, a phased array technique is commonly employed such that the phased array is used to maintain the receive antenna beam pointing at a broadcast source while the antenna-receiver platform is rotated. Since the platform typically has pitch, roll, and heading variations that change with time, rapid pointing angle changes are necessary capabilities required of the communications antenna-receiver. Thus, relatively high bandwidth tracking mechanisms are required to maintain instantaneous beam pointing. Further, a communications link start-up requires that the antenna-receiver subsystem have mechanisms to search the volume of space where the desired source may be located, and acquire an angular position of the source relative to the mobile platform.

One current system known as a smart antenna exploits space selectivity. "Smart-Antenna Systems for Mobile Communications Networks" by Bellofiore, et. al., IEEE Antenna's and Propagation Magazine, Vol. 44, No. 3. Signal processing aspects of the smart antenna has concentrated on the development of efficient algorithms for direction-of arrival (DOA) estimation and adaptive beam forming. After the digital signal processor receives the time delays from each antenna element, it computes the DOA of the signal of interest. The excitations (the amplitudes and phases of the signals) are then adjusted to produce a radiation pattern that focuses on the signal of interest, while turning out any signal not of interest. One smart antenna system utilizes adaptive array systems. After the system down converts the received signal to baseband and digitizes them, the signal of interest is located using the DOA algorithm. The signal of interest and signals not of interest are continuously tracked by dynamically changing the weights (amplitudes and phases). However, adaptive array systems are digital processing intensive. For example, by employing numerous elements to steer the nulls to the signals not of interest, signal processing loads are increased and hence system cost.

SUMMARY OF THE INVENTION

An antenna-receiver communications system and method is provided to mechanize multibeam mobile antenna-receive subsystems. Modern wideband mobile communications antenna-receiver systems are supported and improved over current systems by the present invention. The present invention enables the subsystems to simultaneously receive, acquire, track and output a multiplicity of signals from sources of different locations using a single antenna aperture from a mobile platform. Additionally, the present invention enables these subsystems to provide continuous and simultaneous channel outputs from multiple sources in a changing location and orientation (mobile multi-beam and multi-channel). Further, because of the present invention, these subsystems can be set up as a lower cost mobile multi-beam antenna-receiver that receive high data rates. Further, the present invention enables these subsystems to automatically determine multiple source locations and lock an individual receive beam to each location at system power-up. The present invention supports mobile communications antennas where high directivity, fast acquisition times, high signal bandwidth and fast response beam tracking are required.

Performance of beamsteering and antenna channel coherent summation is improved by the present invention over contemporary systems. In an example of the present invention, the data sampling rate is about two times the communications channel bandwidth. Reduction in data sampling frequency reduces signal processing computational load and system cost.

Features of the invention are achieved in part by continuously determining the angle of arrival of a signal of interest and reconstructing and outputting the input data stream signal from phased array antenna outputs. The angle of arrival is determined by setting $\phi_n$ equal to $-\Delta\phi_n$ for each antenna element channel, and then establishing the set of $\phi_n$ that maximize the sum of the array coherent summation equation. Additionally, the element channel baseband signals are shifted in phase, such that the phase shift values ($\Psi_n$) are set equal to the $\phi_n$ values for phase alignment. In an embodiment, a quadrature down-converter reference signal is shifted in phase by $\Psi_n$. In another embodiment, an I/Q output is multiplied by a complex number having a modulus equal to one, where the complex number includes a phase shift $\Psi_n$ as a phase. The individual phased array antenna output channels are phased aligned exactly to where required by use of the phased array equation and monopulse signal processing. Thus, signal processing losses to the input CNR are avoided. In an embodiment, the present invention employs intermediate frequency (IF) digitizing with digital quadrature down conversion. In another embodiment, the present invention employs baseband digitizing with analog quadrature down conversion.

Additional features of the invention are achieved in part by separating (schematically branching) angle sensing (acquiring and tracking) and beamsteering (aligning channels with a phase shift) from antenna channel coherent summation. The angle sensing and beamsteering functions are not computed at the data rate, but are instead computed at a rate necessary for the beam acquisition and beam tracking function speed requirements. In an embodiment, the antenna channel coherent summation calculations are executed at the data rate and are minimized to their theoretical limit: two multiply-add operations per channel per data sample.

In an embodiment, element channels that are present in a multiple number share an antenna aperture. Each of the element channels maintain a dedicated directive beam, and data from each of the element channels is schematically branched to quadrature down-converter functions dedicated to specific element channels, simultaneously achieving multiple outputs with the DBF system architecture.

Other features and advantages of this invention will be apparent to a person of skill in the art who studies the invention disclosure. Therefore, the scope of the invention will be better understood by reference to an example of an embodiment, given with respect to the following figures.

BRIEF DESCRIPTION OF THE DRAWINGS

The foregoing aspects and many of the attendant advantages of this invention will become more readily appreciated by reference to the following detailed description, when taken in conjunction with the accompanying drawings, wherein.

DETAILED DESCRIPTION OF THE INVENTION

Figure 1:
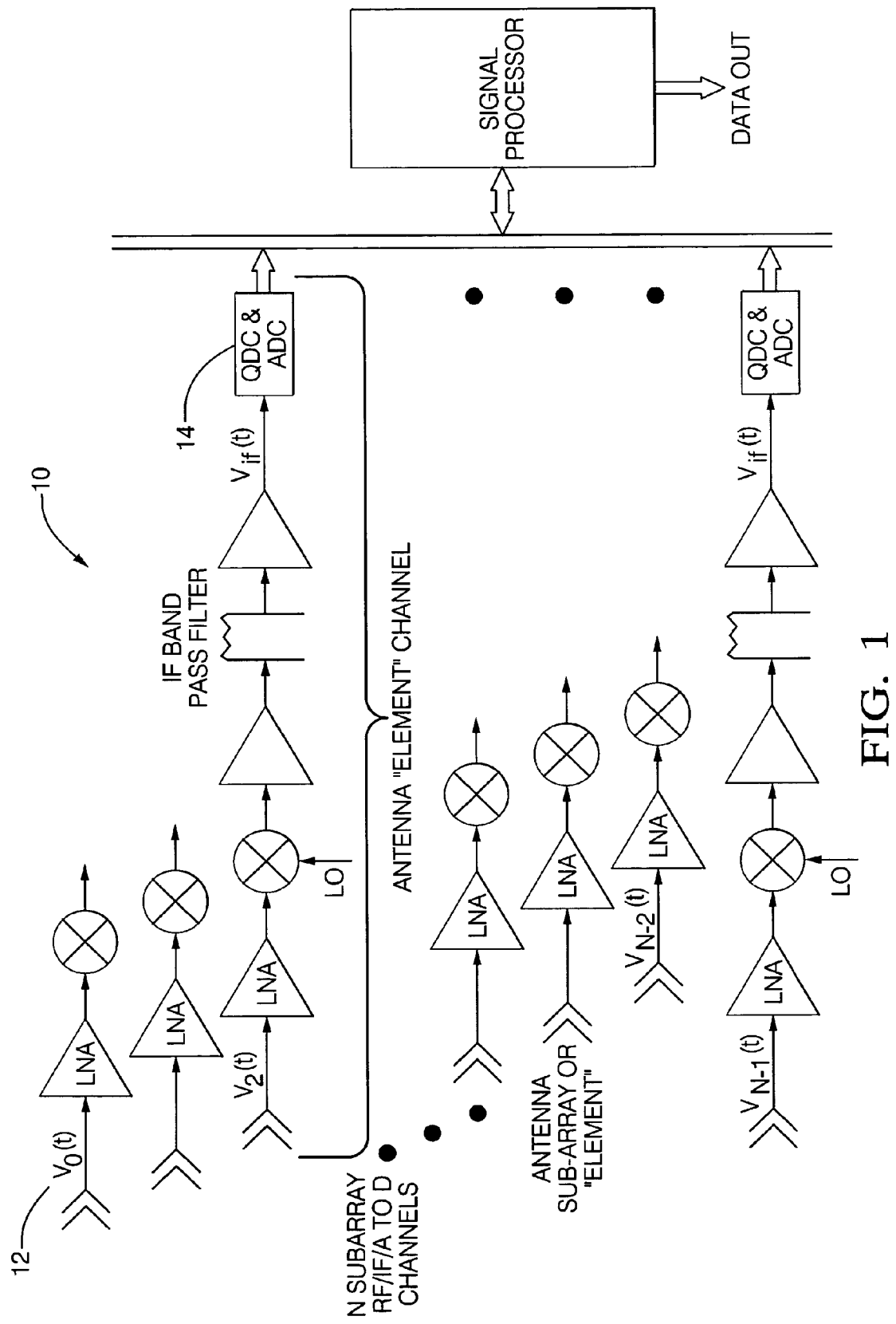
FIG. 1 is a schematic view of a contemporary Digital Beam Forming (DBF) type phased array block diagram.

Exemplary embodiments are described with reference to specific configurations. Those of ordinary skill in the art will appreciate that various changes and modifications can be made while remaining within the scope of the appended claims. Additionally, well-known elements, devices, components, methods, process steps and the like may not be set forth in detail in order to avoid obscuring the invention. Further, unless indicated to the contrary, the numerical values set forth in the following specification and claims are approximations that can vary depending upon the desired characteristics sought to be obtained by the present invention.

Communications systems having digital signal processing operations currently utilize an adaptive phased array antenna that acquire and track the locations of a multiplicity of broadcast stations from a mobile platform using a Digital Beam Forming (DBF) phased array antenna technique. In addition to determining the angle of arrival of a signal of interest, current systems reconstruct and output the desired input data stream signal from the multiplicity of phased array antenna outputs. The existing systems described herein are integrated antenna-receivers that perform receive beam angle sensing and additionally perform receive beam steering. Receive beam angle sensing refers to acquiring and tracking the location angles of every remote transmitter source available whose transmissions are recognizable and/or selected by the particular receiver structure in the system. Receive beam steering refers to reconstructing and outputting one or multiple demodulated data streams that illuminate the collection of sub-arrays (within the phased array antenna) that are part of the system.

Existing systems are utilized for mobile communications antennas and require high directivity, fast acquisition times, high signal bandwidth and fast response beam tracking. These requirements are further needed for an antenna on a mobile platform that must compensate for pitch, roll, and heading changes in the platform orientation. Although DBF has long been used for mobile phased array antennas, it has shortcomings that make its use for high data rate systems unattractive due to high signal processing loads, hence high cost. In an embodiment, the present invention provides a DBF type of phased array method for use in high data rate systems such as Direct Broadcast Satellite TV (DBS) by low cost methods.

In regard to the present invention, the source angle finding, tracking, and beam steering described herein can be applied to modulation techniques carrying information (digital or analog). For example, the present invention addresses problems experienced by existing systems in receiving DBS signals from moving platforms. DBS as described herein refers to four different large-scale television transmission systems where the TV transmissions occur from one or more satellites in each system: DirecTV, Sky Angel, RIL DBS, and Dish. The respective satellites are in geo-synchronous orbits, and there are eight satellite positions in the sky shared by the four systems of interest. It is required that the mobile satellite terminals have very high directivity to enable the DBS type communications link.

This application of the invention is useful, as detailed below, since the data rates (about 48 Mbps) and signal bandwidths (about 24 MHz) are substantial, the required antenna directivity (about 33 db) is high, the allowance of CNR losses due to signal processing is about 0 db, and tracking/acquisition performance is fast. Existing DBF antennas are impractical with this application, having a high number of existing sub-arrays and high bandwidth input signal.

In regard to this example, it is essential that the antenna-receiver system have the ability to locate and track all satellite source transmissions that are between 25 and 65 degrees above the horizon. Nominal satellite elevation angles for locations within the continental United States are between 35 and 50 degrees, where performance over a greater span of elevation angles is necessary to account for platform pitch and roll. The azimuth angle of the transmission sources depends on the platform heading, and can be any of the 360 degrees.

In order to satisfy the above-described scenarios, the antenna-receiver systems require relatively rapid source location acquisition performance. The numerous drop-outs in signal reception that can be experienced by mobile driving customers, where signal blockage occurs such as in tunnels, must be mitigated by rapid re-acquisition of the desired signal. Sudden changes in platform pitch, roll, and heading coordinates demand relatively wide band tracking loop parameters. The present invention facilitates such performance, particularly high speed signal acquisition from a cold start.

The examples shown below, which demonstrate embodiments of the invention, address the signal format described for a DBS system in the DBS digital TV standards. It is to be appreciated that the present invention can be applied to a DBS system having variations from these standards as well. DBS systems have a 3 db signal bandwidth of 24 MHz and a 30 db bandwidth of 30 Mhz, supporting a data rate of 48 Mbps in a frequency division multiplex scheme of 16 individual communications channels spaced over a 500 MHz frequency span. Existing DBF type phased array systems fail to support such high signal bandwidths in an economical fashion. The present invention, as described below, can support most required signal bandwidths, although the example system parameters discussed below address a DBS type of signal. Further, it is to be appreciated that this description of the present invention addresses quadrature phase shift keying (QPSK) modulation as used by various DBS systems; however the concepts and present invention are independent of any particular modulation scheme.

A DBS satellite terminal must have adequate G/T performance to make the communications link with margin allocated to partial blockage by obstacles including trees, etc. Further, there must be adequate rejection of satellites in adjacent slots to the satellite of interest such that the multiplicity of signals incident on the antenna aperture from the many satellites can be separated. Thus, an antenna system must achieve adequately narrow beamwidths in the azimuth plane, or achieve null steering to reject unwanted signals. The DBF techniques provided by the present invention support either method or any combination of both methods. The DBF methods and system of the present invention improves support of highly sophisticated array designs with numerous sub-arrays and advanced pattern synthesis techniques such as adaptive null steering as compared to classical array construction techniques. Since the DBF system and method of the present invention provides better precision as compared to analog means in mechanizing antenna channel complex weighting (amplitude and phase), a higher performing array pattern synthesis results.

It is to be appreciated that the following embodiments of the present invention can be employed in conjunction with known communications methods and systems. Referring to the drawings wherein identical reference numerals denote the same elements throughout the various views, FIG. 1 illustrates a contemporary DBF type phased array block diagram 10. Each sub-array of the phased array antenna has a receiver channel comprised of an RF section, an IF section, a quadrature down-converter, and an analog to digital converter 14. "QDC&ADC" as used herein refers to Quadrature Down-Conversion and Analog-to-Digital Conversion.

The incident electromagnetic waves 12 on the phased array elements (sub-arrays) can be described by describing the input that appears over one element of the antenna, which is the basic equation for the input signal. In general, v(t) for any one element can be expressed as $v(t)=\text{Re}\{z(t)e^{j\omega_{RF}t}\}$ where the communication channel link is at the frequency $\omega_{RF}$ and z(t) is the modulation waveform and is in general complex. The QPSK example is shown to be equivalent to this expression as follows:

$$v_{QPSK}(t) = b_o(t)\cos(\omega_{RF}t) + b_e(t)\sin(\omega_{RF}t)$$

$$= b_o(t)\frac{e^{j\omega_{RF}t} + e^{-j\omega_{RF}t}}{2} +$$

$$b_e(t)\frac{e^{j\omega_{RF}t} - e^{-j\omega_{RF}t}}{2j}$$

$$= \frac{1}{2}[b_o(t) - jb_e(t)]e^{j\omega_{RF}t} +$$

$$\frac{1}{2}[b_o(t) + jb_e(t)]e^{-j\omega_{RF}t}$$

$$= \frac{1}{2}(z(t)e^{j\omega_{RF}t} + z^*(t)e^{-j\omega_{RF}t})$$

$$= \text{Re}[z(t)e^{j\omega_{RF}t}]$$

Equation 1 where $z(t) = b_o(t) - jb_e(t)$.

The digital bit stream that QPSK is designed to convey through the communications channel is typically split into its odd, $b_o$, and even, $b_e$, parts, which is comparable to expressing that every other bit in the data sequence is alternately applied to the two quadrature carrier components, sin(x) and cos(x).

Given the general expression for the input on one element of the array antenna, an expression for the other elements can be derived by accounting for the time of arrival differences between the various element signals. For a wave arriving at an oblique angle $\theta_o$ with respect to the plane of the array, the expression for each element signal $v_n$ is:

$$v_n(t) = \text{Re}[z(t-\tau_n)e^{j\omega_{RF}(t-\tau_n)}]$$

Equation 2 where $\tau_n$ is the time of signal arrival difference between the array phase reference channel and channel n. If the largest delay between any two elements in the array is considerably less than the highest modulation frequency in the modulation envelope z(t), which is typically the case, and is the case for DBS communications systems, then z(t−$\tau$)≈z(t) for all $\tau$ and the expression for the element signal becomes $$v_n(t)=Re[z(t)e^{-j\omega_{RF}\tau_n}e^{j\omega_{RF}t}].\qquad \text{Equation 3}$$

The term $e^{-j\omega_{RF}\tau_n}$ is a phase term, hence the $n^{th}$ element signal can be more explicitly expressed as $$v_n(t)=Re[z(t)e^{-j\Delta\phi_n}e^{j\omega_{RF}t}]$$

where $\omega_{RF}\tau_n=\Delta\phi_n$, $$\Delta\phi_n=2\pi d_n/\lambda\cos(\theta_o),\qquad \text{Equation 4}$$

$\lambda$=carrier wavelength
$d_n$=distance from the phase center of element n to the phase center of the phase reference channel
$\theta_o$=angle of arrival The difference between channel waveforms is the phase factor $\Delta\phi_n$ across the array. This is a fundamental basis for beam forming in phased array antennas. One factor utilized by the present invention is that DBF processing can be executed even though the processes of carrier synchronization and bit period synchronization have not yet occurred.

After down-converting and filtering, each IF signal shown in FIG. 1 can be written as $$v_{n,if}(t)=Re[z(t)e^{-j\Delta\phi_n}e^{j\omega_{if}t}]\qquad \text{Equation 5}$$

Complex Envelope Extraction

Next considered is an approach to determine the phase shift of the signals across the array, i.e. to characterize the $\Delta\phi_n$ (phase factor) for each IF signal, which is comparable to finding the complex envelope $z(t)e^{-j\Delta\phi_n}$ for each of the IF signals. Contemporary systems use a quadrature down-converter, which essentially correlates the complex signal against sin and cos functions.

Quadrature Down Conversion and Digitizing

FIG. 1 refers to the quadrature-down-conversion (QDC) & analog-to-digital conversion (ADC) functions 14. Two systems are currently used: intermediate frequency (IF) digitizing with digital quadrature down-conversion, and baseband digitizing with analog quadrature down-conversion. Each method extracts the IF signal complex envelope. The IF digitizing method yields a virtually error free quadrature down conversion process at the expense of sampling frequency and computational load. The baseband digitizing method is currently less expensive due to lower required data sampling rates and relief of computational load by down converting with analog means.

IF Digitizing with Digital Quadrature Down-Conversion

The IF signals 21 from each element channel are digitized by using a sampling frequency that satisfies the bandpass sampling theorem. For example, this case includes an IF frequency of 159.5 MHz and a sampling frequency $f_s$ of 71.1 MHz. The signal 30 db bandwidth in this example is 30 MHz, thus the sampling frequency is slightly over two times the signal bandwidth, as discussed above. The result of digitizing is a data sample sequence which is still bandpass in nature and is centered at frequency $f_1=f_{if}-Kf_s$, K is an integer. The value of K is such that the frequency difference between the $K^{th}$ harmonic of $f_s$ and the IF frequency shifts the IF signal spectrum to lie within the digital baseband frequency domain, i.e. between +/−35.5 MHz in this case. In the example, K=2 and the digitized signal has a center frequency of 17.3 MHz. The output of the A/D converter 22 can be written as the sampled sequence of the waveform:

$$v_{n,A/D}(t)=Re[z(t)e^{-j\Delta\phi_n}e^{j\omega_1 t}]\qquad \text{Equation 6}$$

Figure 2:
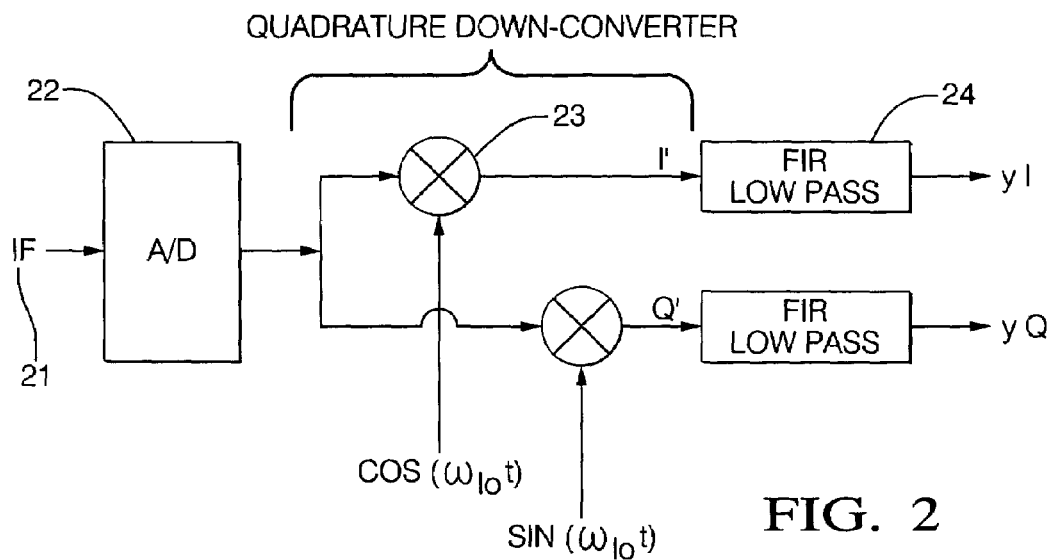
FIG. 2 is a schematic view illustrating a contemporary method of extracting the input complex envelope, by digital quadrature down-conversion.

The data sequence is down-converted by digital methods in a quadrature scheme by multiplying the A/D outputs by sin and cos functions whose frequency is near or at the data sequence center frequency $\omega_1$. The process is shown in FIG. 2, and is a fully digital operation. By using a digital down-converter 23, the realized quadrature accuracy and stability are improved over analog circuits.

As shown in FIG. 2, digital quadrature down-conversion 23 with low pass filtering is used by contemporary systems to extract the input complex envelope. A finite impulse response filter (FIR) type filter 24 is used because of its fixed group delay versus frequency characteristic. The down-converter is mechanized by multiplying numbers, then filtering the result. All operations are accomplished within the digital processor hardware.

The output of the down-converter 23 is $$y_n(t)=yI-jyQ=z(t)e^{j[(\omega_1-\omega_{lo})t+\Delta\phi_n]}=z(t)e^{j\theta_\epsilon},\qquad \text{Equation 7a}$$

where $\theta_{\epsilon=(\omega_1-\omega_{lo})t+\Delta\phi_n}$.

The cos and sin signals are generated in the processor, where $\omega_{lo}$ is under precise numerical control. The low pass filters 24 are necessary to eliminate the sum frequency components $\omega_1+\omega_{lo}$ that result from the multiplication process. Equation (7a) shows that the complex envelope z(t) has been extracted, albeit with a non-zero frequency carrier when $\omega_1\neq\omega_{lo}$.

Variable Reference Signal Frequency

The numerical local oscillator frequency $\omega_{lo}$ of FIG. 2 need not be fixed, since its particular value does not affect the angle finding and beam steering functions described below. The $\omega_{lo}$ can be adjusted according to feedback signals (generated either inside or outside the digital signal processor) to suit various receiver functions. The reference signals in the down-converter can assume the function of a voltage controlled oscillator (VCO) or a numerically controlled oscillator (NCO) to achieve phase lock to the input IF signals mechanizing carrier synchronization, frequency tracking, frequency locking, or frequency adjust for variability in the IF signals to maintain a desired frequency difference $\omega_I-\omega_{lo}$, or for any purpose required by the receiver architecture definition.

BaseBand Digitizing with Analog Quadrature Down-Converter

Figure 3:
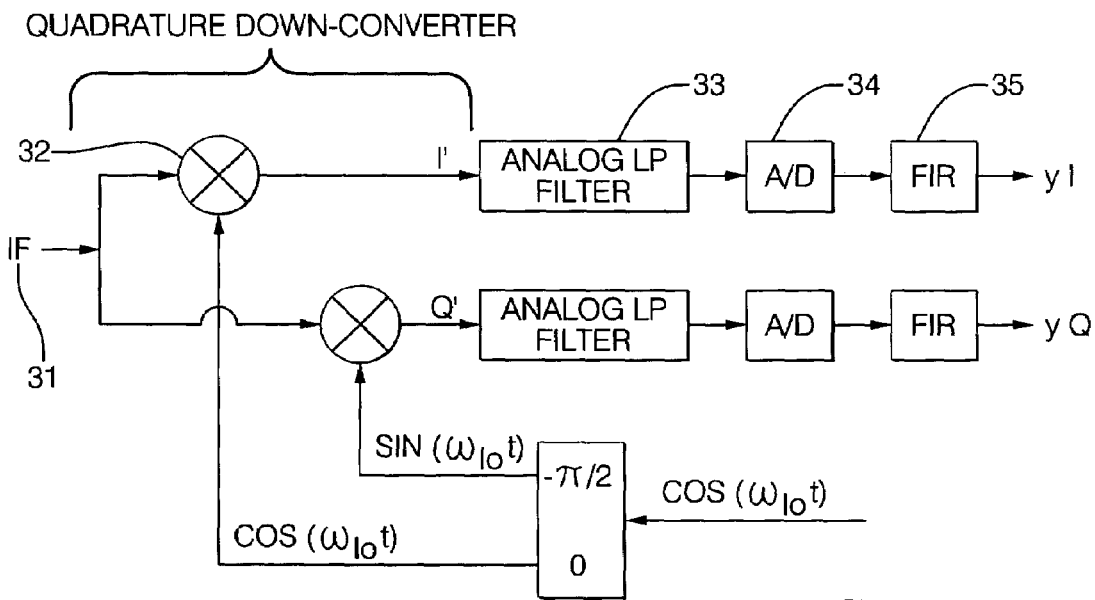
FIG. 3 is a schematic view of another contemporary method of extracting the input complex envelope, by analog quadrature down converter with low pass data sampling.

Referring to FIG. 3, analog quadrature down conversion with low pass data sampling is also used by contemporary systems to extract the input complex envelope. The IF signals 31 are quadrature down-converted 32 in frequency to baseband, filtered 33, and then digitized 34. The A/D data sampling rate depends on the complexity of the preceding low pass filters, the desired complexity of the FIR filters 35, and the signal bandwidth.

The local oscillator, signal multipliers (mixers), and baseband low pass filters 33 are analog. The filters 33 are necessary to reject the unwanted upper sideband signal that results from the mixing process, and to select one of many IF signal channels that would appear if the application system incorporates a frequency division multiplex scheme. This frequency selection can also occur at the IF by using a narrowband IF bandpass filter. The digitized baseband may need further filtering in the digital domain to eliminate any adjacent frequency channel signals in the baseband. It is to be appreciated that the data sampling rate, FIR filter complexity, and low pass filter selectivity are inter-related in any particular design, and depend on the application.

The resulting digitized baseband signal in the $n^{th}$ array element channel is then a sampled data sequence of the signal $$y_n(t)=yI-jyQ=z(t)e^{j[(\omega_{if}-\omega_{lo})t+\Delta\phi_n]}=z(t)e^{j\theta_\epsilon},$$

where $\theta_\epsilon=(\omega_{if}-\omega_{lo})t+\Delta\phi_n$.  Equation 7b

Inspection of Equations 7a and 7b shows that either method results in the IF signal complex envelope being captured in the digitized signals. Similar to the IF digitizing mechanization, the LO signal frequency shown in FIG. 3 can be generated by a VCO, hence can be made to vary. The LO in FIG. 3, by analog means, can serve all the functions that the reference signals would serve in the digital down-converter implementation of FIG. 2.

Angle of Arrival Processing

In an embodiment of the present invention, the angle of arrival of a particular signal is determined by the array coherent summation equation where the complex sum is computed while varying the $\phi_n$.

$$\sum_{n=0}^{N-1} y_n(t) w_n e^{j\varphi_n} = \sum_{n=0}^{N-1} z(t) e^{j[(\omega_1-\omega_{lo})t+\Delta\phi_n]} w_n e^{j\varphi_n}$$

$$= z(t)e^{j(\omega_1-\omega_{lo})t} \sum_{n=0}^{N-1} w_n e^{j\varphi_n} e^{j\Delta\phi_n}$$

Equation 8

The $w_n$ are amplitude weighting terms applied to the channels to effect a tapered antenna aperture for whatever purpose may be necessary in a given application. The sum in Equation 8 is independent of the modulation function z(t) and baseband offset frequency $\omega_{1-\omega lo}$ since these components are common to all the antenna element channels. The sum is maximized when $\phi_n$ is set to $-\Delta\Phi_n$ for each of the n antenna element channels. In this way, the angle of arrival is measured, for example by maximizing the sum in Equation 8 by varying the $\phi_n$ and then inspecting the $\phi_n$ that does maximize the sum.

The relationship between signal angle of arrival and the $\phi_n$ is defined by the geometry of the array, specifically the $d_n$. The element $d_n$ is the distance from the phase center of element n to the phase center of the phase reference channel. Once the set of $\phi_n$ that maximizes the sum of Equation 8 are determined, then the angle of arrival is known. As an example, from Equation 4, in the case of a uniformly spaced linear array, Equation 9 applies.

$$d_n = nd \therefore \Delta\phi_n = n\Delta\phi$$

$$\varphi_n = n\varphi = -n\Delta\phi, \text{ hence}$$

$$\theta_o = \text{angle of arrival} = \cos^{-1}\left(\frac{-\varphi\lambda}{2\pi d}\right).$$

Equation 9

Figure 4:
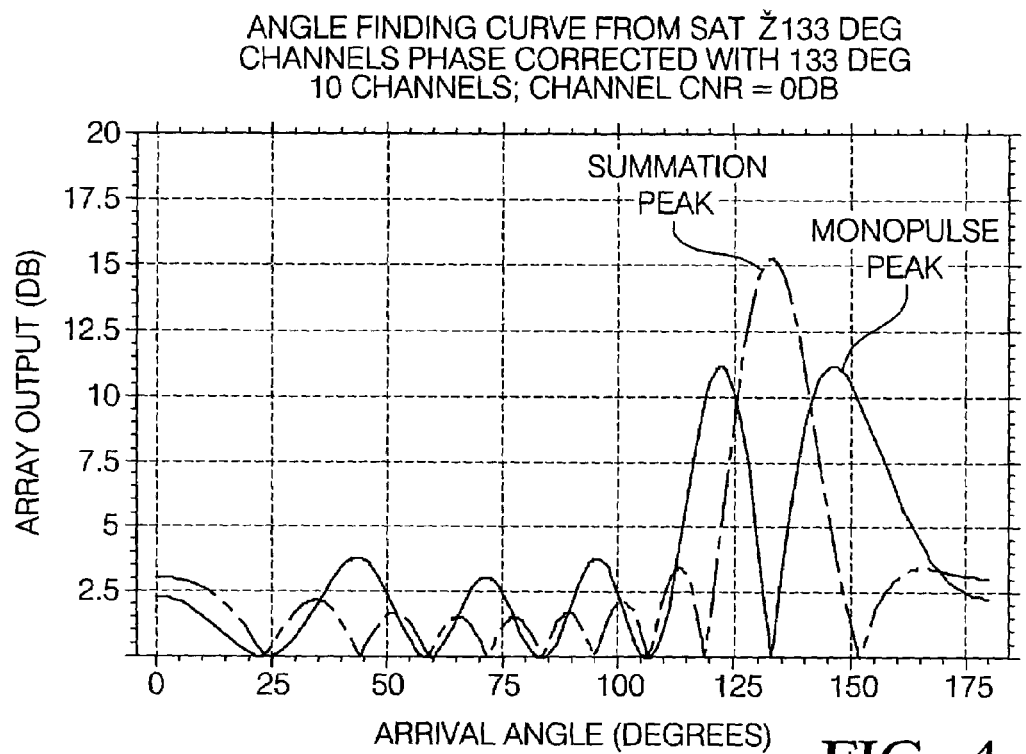
FIG. 4A is a diagrammatic view illustrating angle finding results for a communications source at 133 degrees in a 10 element linear array, in accordance with an embodiment of the present invention.
FIG. 4B is a diagrammatic view illustrating the monopulse response in relation to FIG. 4A, in accordance with an embodiment of the present invention.
Figure 4:
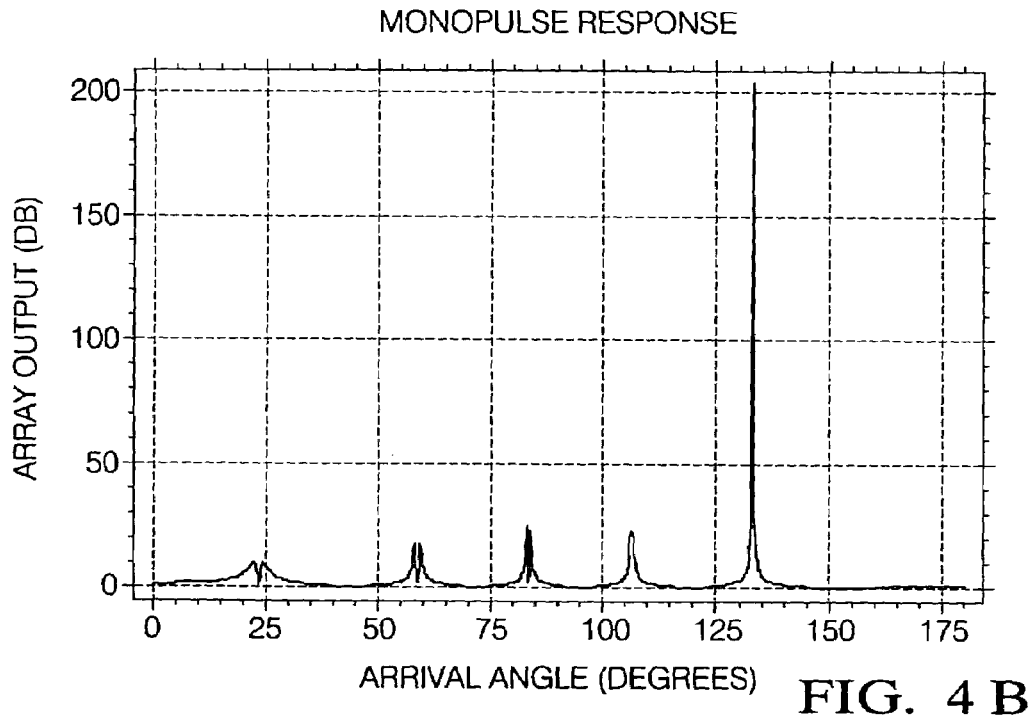

Equations 4 and 8 are part of the phased array theory, and apply to linear, planar, and conformal arrays with uniform and non-uniform element spacing $d_n$. The present invention as described herein can apply to these types of phased arrays. The linear array example is discussed for simplicity and is not meant to limit the present invention. An example of the linear array angle finding is shown in FIG. 4A. A further understanding of the above description can be obtained by reference to the following experimental examples that are provided for illustrative purposes and are not intended to be limiting.

FIG. 4A illustrates angle finding results for a communications source at 133 degrees in a 10 element linear array, wherein 90 degrees is the antenna boresight. The monopulse response shown in FIG. 4B exemplifies that the beam vector can be utilized by any number of angle finding methods such as conical scan, sequential lobing, monopulse processing, adaptive-array systems, and switched-beam systems. The beam vector can also be used to adaptively steer antenna nulls to desired locations, and to form multiple beams to receive multiple sources.

The $y_n(t)$ (shown in Equation 7), are the beam vector of the signal source. This vector can be operated on by a number of angle finding methods, some of which use Equation 8. By using Equation 8, the full potential of the array aperture is realized, and the receive beam can be exactly pointed to the desired source within the numerical precision limits imposed by finite register arithmetic. In contrast, the use of some of the conventional processes such as Fourier transforms (FFTs) performed on the beam vector cannot point the receive beam exactly, hence inherently have associated signal-to-noise ratio losses.

Given numerous sources transmitting at the same frequency with the same modulation formats, a single beam vector can be used to determine the number and angular location of each of the multiple sources, as long as the angular separation between sources is physically resolvable by the array aperture. Additionally, the beam vector is generated from one sample of the baseband data. There is a statistically independent beam vector sample available from the element channels for every member of their data sequences.

Monopulse response interpretation techniques allow the DBF antenna-receiver to steer it's receive beam(s) directly to its source(s). It is to be appreciated that use of monopulse is one example of all the known angle finding techniques that can be used within the context of the over-all DBF antenna-receiver design concept.

Beam Steering

Figure 5:
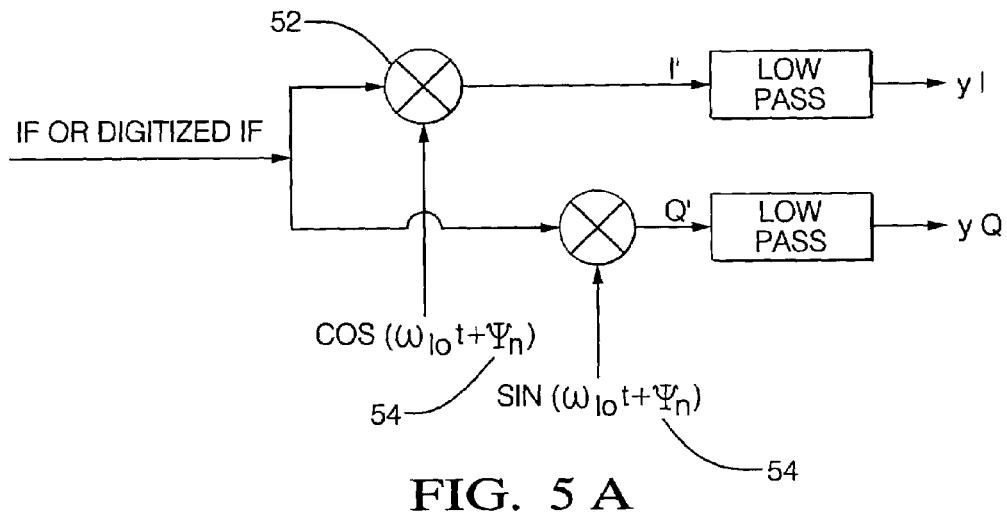
FIG. 5A is a schematic view illustrating the application of a phase shift to digital down-converter signal sources, in accordance with an embodiment of the present invention.
FIG. 5B is a schematic view illustrating multiplying an I,Q output by a complex number having a phase shift, in accordance with an embodiment of the present invention.
Figure 5:
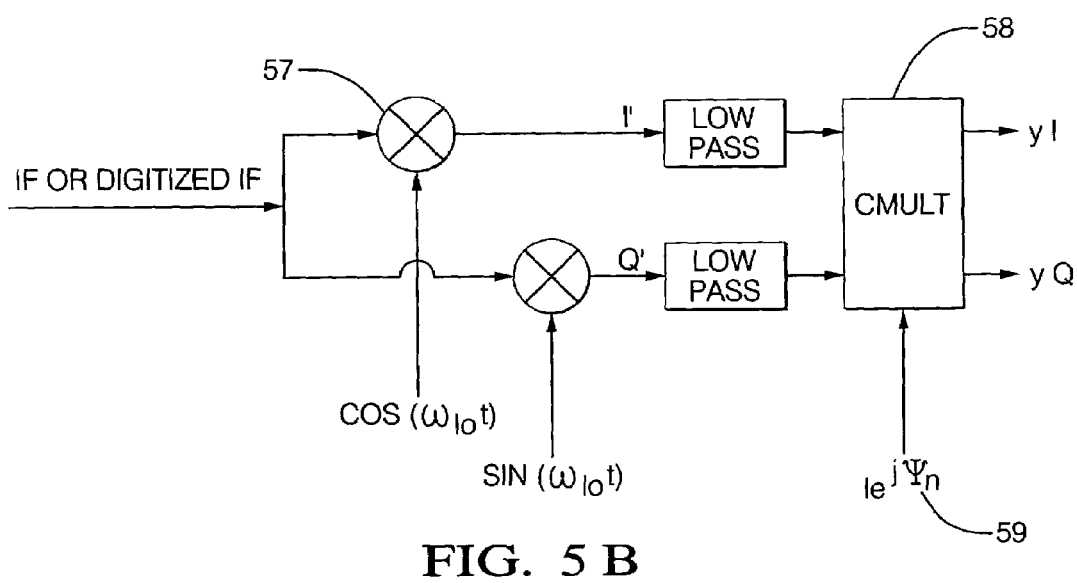

As described above, the present invention determines the angle of arrival of a source. Additionally, the present invention phase aligns the N antenna element channels (beam steering). In regard to phase alignment, the element channel baseband signals are shifted in phase according to need, either by shifting the phase of the quadrature down-converter reference signals or by directly multiplying the in-phase/quadrature modulator (I,Q) output by a complex number, of modulus=1, which has a required phase shift as its phase. FIG. 5A exhibits applying the required phase shift 54 to the IF signal sources passed to the quadrature down converter 52. FIG. 5B exhibits multiplying the I,Q output from quadrature down converter 57 by a complex number of the required phase shift 59. CMult 58 refers to a complex multiply operation.

Either phase shifting method (shown in FIGS. 5A and 5B) can be applied to a system, regardless of the method of digitizing/down-conversion. In the case where the system and method shown in FIG. 5A is used with an analog down-converter, the LO signal can be provided by a numerically controlled oscillator. When employed with a digital down-converter, the system and method shown in FIG. 5A can be more computationally efficient as compared to the system and method shown in FIG. 5B. In an example, the real multiplication operations at the data rate required in the system and method shown in FIG. 5A are half as many as in the system and method shown in FIG. 5B, i.e., two multiplication operations versus four multiplication operations.

The values that the various phase shifts ($\Psi_n$) take on (shown in items 54 and 59) are determined by the angle finding process, hence $\Psi_n=\phi_n$ (Equation 8) for phase alignment. In the digital down-converter, the signal processing load of multiplying the data samples by the reference signals is increased by a minor extent by the inclusion of a phase offset in each of those signals. Once the $\Psi_n$ are established, it is unnecessary for their values to change until relative motion occurs between the source and the antenna-receiver. Update rate requirements for the $\Psi_n$ are dictated in the system application external dynamics. In contrast, in contemporary methods the update rate requirements are dictated by the input data rate (signal bandwidth).

Beam Steering Feedback and Correction

Once the beam is steered, as described above, the present invention continuously points the beam at the source(s) as a mobile platform repositions. That is, when antenna element channels are phase aligned, angle sensing and beam steering is continued to provide accurate beam pointing over time as required by platform dynamics.

Figure 6:
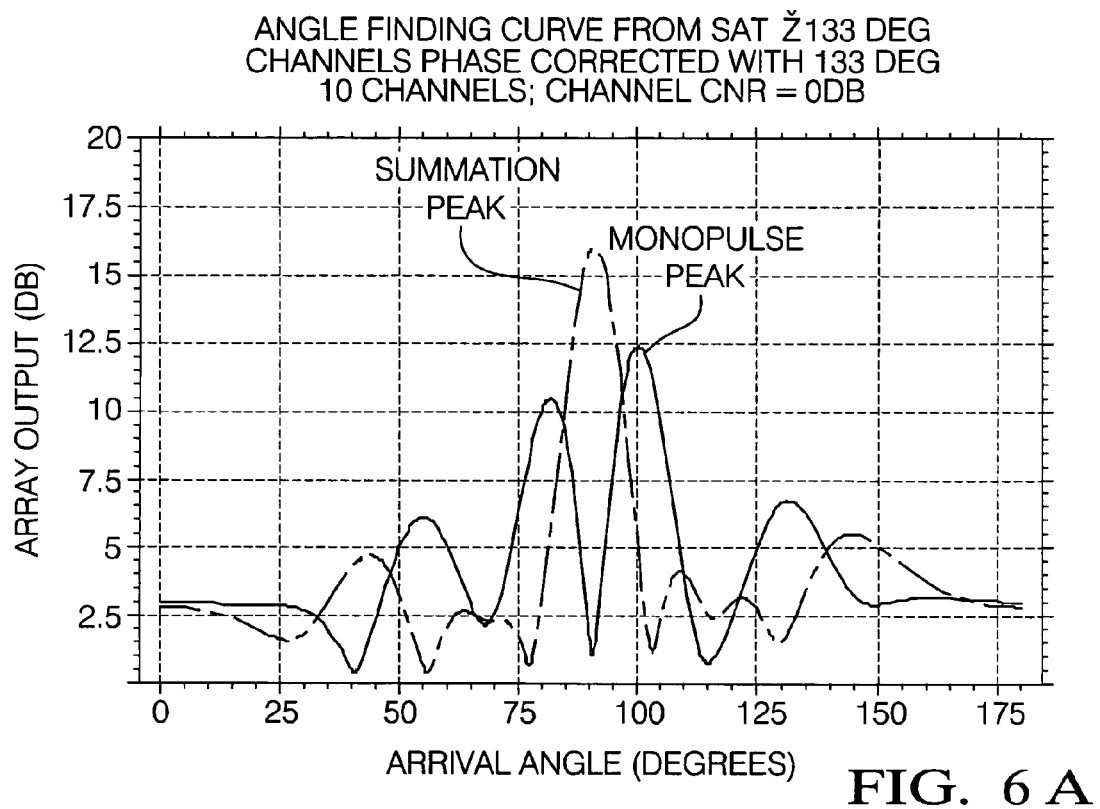
FIG. 6A is a schematic view illustrating angle finding responses when element channels are phase aligned, in accordance with an embodiment of the present invention.
FIG. 6B is a schematic view illustrating the monopulse response in relation to FIG. 6A, in accordance with an embodiment of the present invention.
Figure 6:
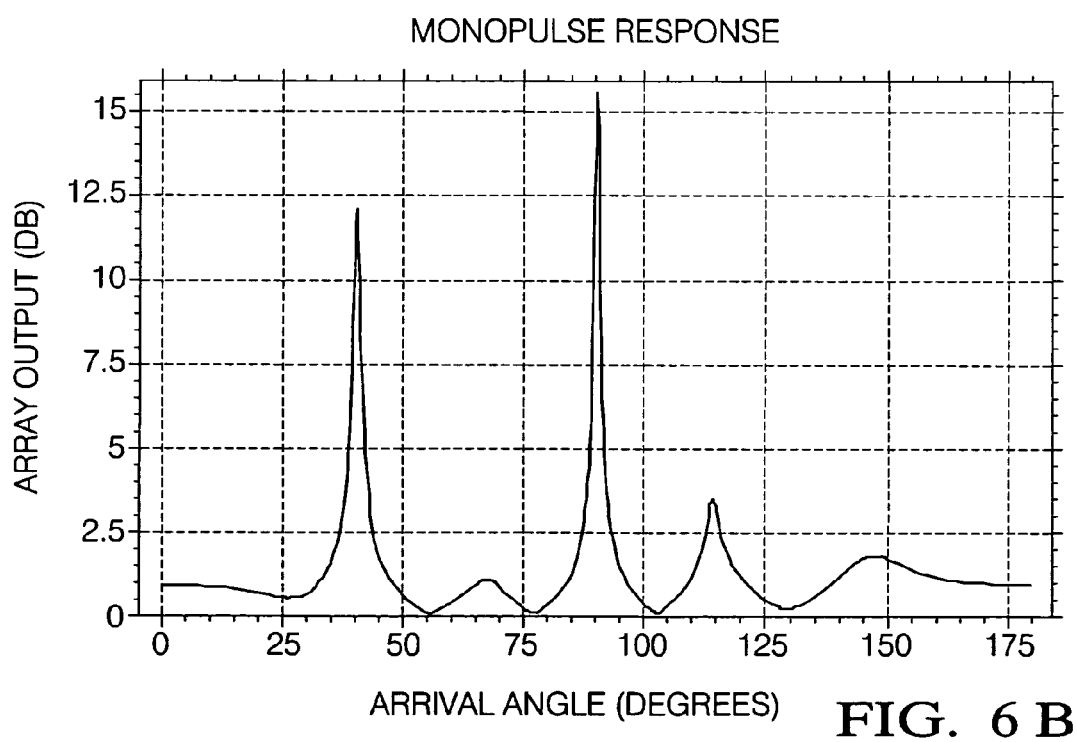

When in the aligned state, the system angle sensing curves are centered on boresight as shown in FIGS. 6A and 6B. These figures illustrate angle finding responses when element channels are phase aligned. Checks to verify that the monopulse peak occurs at nearly the same angle as the summation peak can eliminate spurious monopulse peaks. As an example, a monopulse peak and a summation peak are shown in FIG. 6A. By sensing the output of the monopulse difference curve (shown in FIG. 6A), as the platform moves, the beam is held on station. Due to platform motion, when the receive beam becomes slightly misaligned, the three curves shown in FIG. 4A, 4B and FIG. 6A, 6B move either to the left or to the right, indicating either larger or reduced phase shift to be applied to the baseband signals to maintain the antenna beam pointed directly at the source. The present invention system constantly measures relative angle of arrival, and through these negative feedback techniques maintains the phase aligned angle sensing curves on boresight, indicating a correctly pointed beam. The actual beam angle is determined from the steering phases $\Psi_n$ applied to the baseband signals that maintain the angle sensing curve at 90 degrees.

For a planar array, two sets of angle sensing curves are provided, one for each orthogonal angle coordinate. In two dimensions, the applied phase shifts $\Psi_n$ are set such that both azimuth and elevation angle sensing curves are centered at 90 degrees. When the receive beam is correctly pointed at the source, the indicated beam angle of the phase corrected channels is 90 degrees, coincident with the phased array aperture normal vector. Thus, the beam steering mechanisms provide a built-in implicit means for determining where to steer the beam. A reference value for beam steering tracking feedback loops is provided along with precise quantitative angle error signals to drive the feedback loop. The angle error signal is the departure from 90 degrees taken by the steered beam boresight angle.

Alternative angle error processing techniques can be utilized in the feedback loop by utilizing the angle sensing feedback features of the beam steering mechanism. The monopulse angle sensing discussed above is an example and an optimal approach of angle error processing is application dependent. A simpler approach may be to determine the angle of the beam summation peak by correlation with a reference curve. It is to be appreciated that other angle sensing means can be employed.

Reduced Cost Practice

Figure 7A:
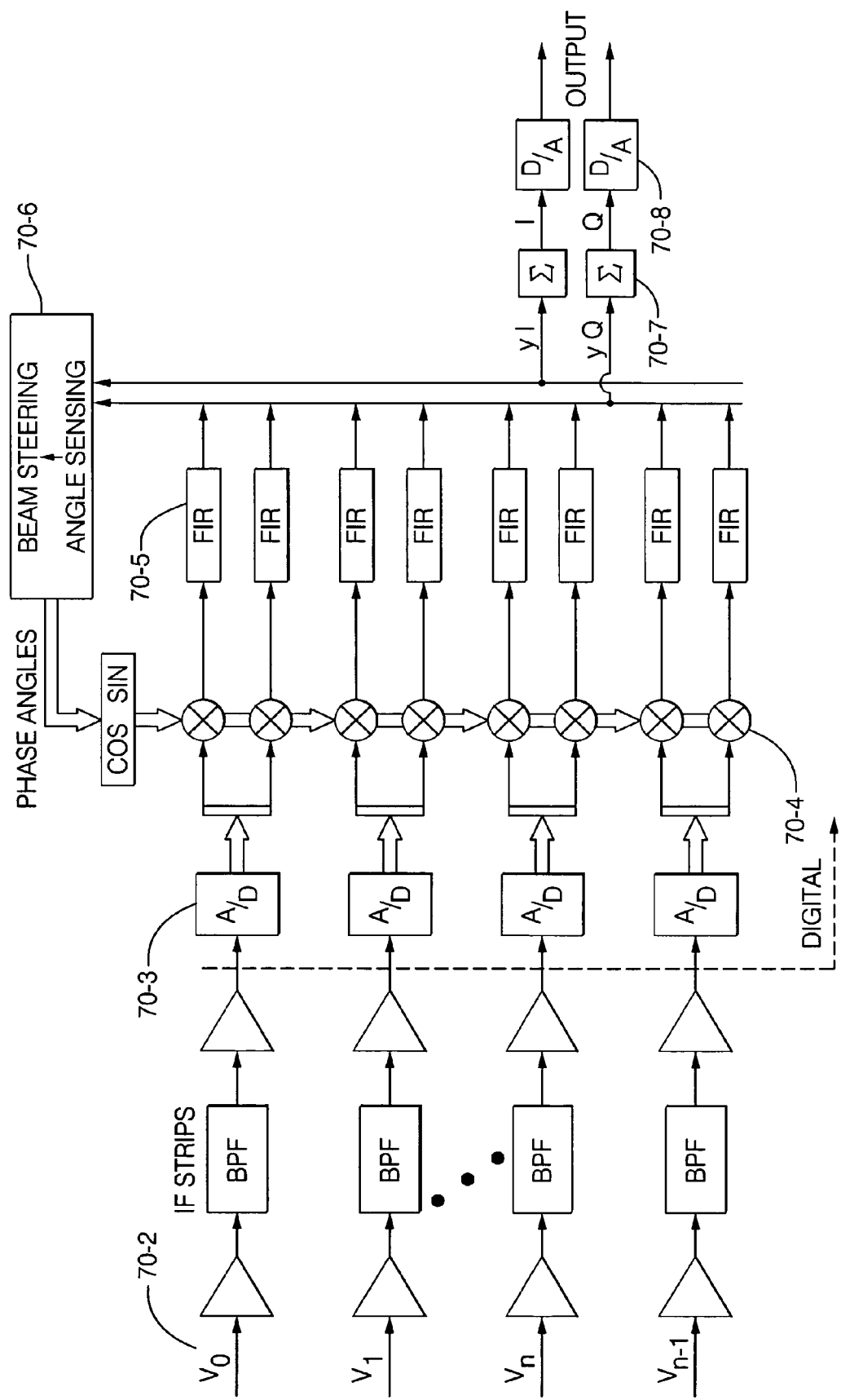
FIG. 7A is a schematic view illustrating beam forming employing the method and system as in FIG. 5A, utilizing IF digitizing with digital quadrature down conversion, in accordance with an embodiment of the present invention.
Figure 7B:
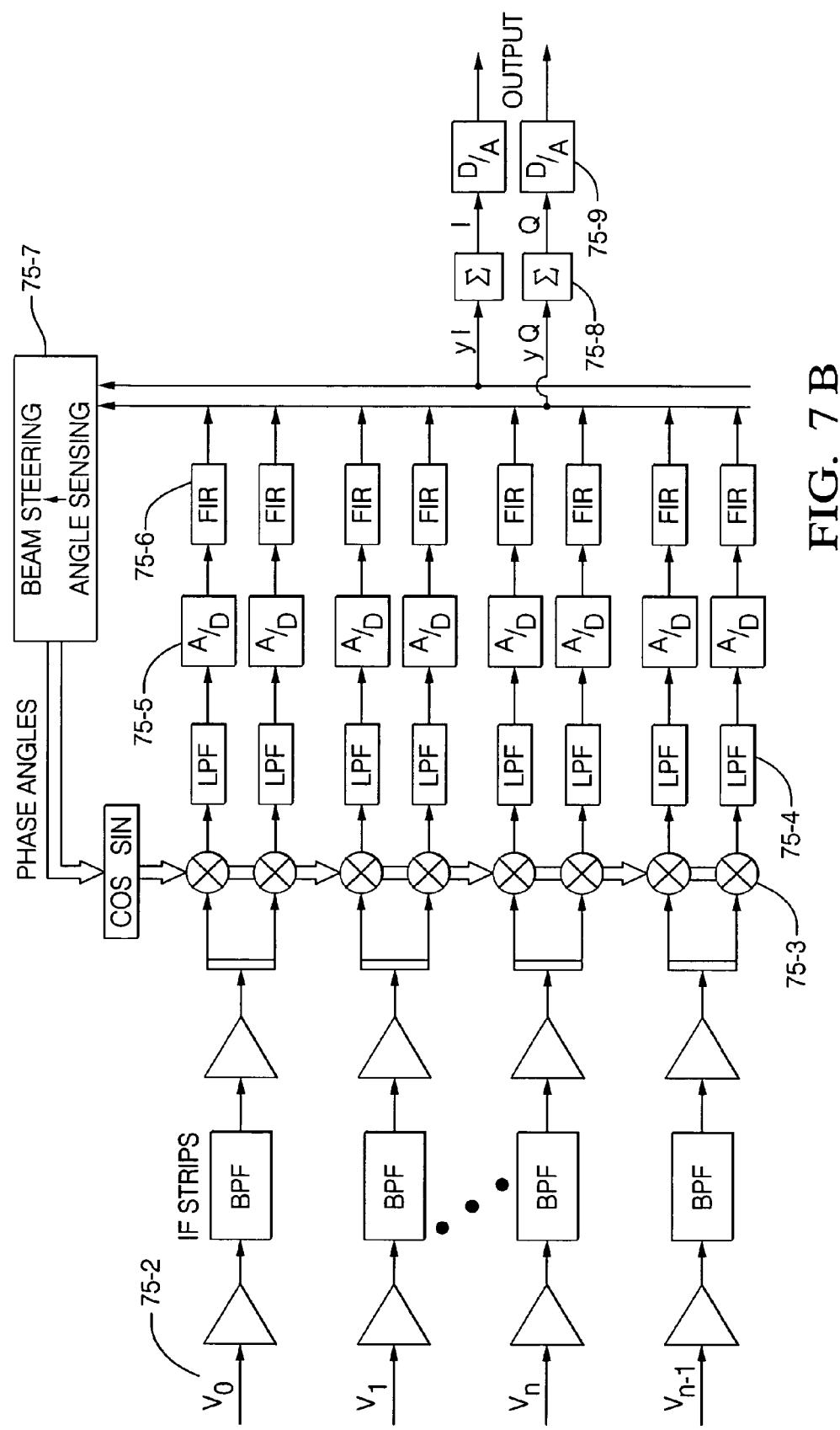
FIG. 7B is a schematic view illustrating beam forming employing the method and system as in FIG. 5A, utilizing baseband digitizing with analog quadrature down conversion, in accordance with an embodiment of the present invention.

In another embodiment, the present invention provides a lower cost method and system of beamforming. FIGS. 7A and 7B are schematic diagrams including signal processing components described above used in a system. FIG. 7A is a schematic view illustrating beam angle sensing, beam steering and beam forming, employing IF digitizing with digital quadrature down conversion. Basic N channel DBF signal processing is provided for wideband communications, using digital quadrature down-converters as phase shifters by controlling the reference signal phases. The reference signal phases are controlled as discussed above. In an embodiment, each sub-array of the phased array antenna includes a receiver channel employing an RF section receiving incident electromagnetic waves 70-2, an IF section, an analog to digital converter 70-3, a quadrature down-converter 70-4, a FIR filter 70-5, angle sensing and beam steering functions 70-6, a summation function 70-7 for receiving data sequences from the element channels, and a digital to analog converter 70-8 located at the output. The required phase shift is applied to the IF signal sources passed to the quadrature down converter 70-4. When antenna element channels are phase aligned, angle sensing and beam steering 70-6 is continued to provide accurate beam pointing over time as required by platform dynamics.

Reduced Processing Load Architectures

A multiplicity of FIR low pass filters are used in the method and system shown in FIG. 7A. These functions can potentially be computationally intensive. In an alternative embodiment, as shown in FIG. 7B, baseband digitization of complex envelope extraction is utilized to provide beamforming. Although digital filter functions are also performed (like FIG. 7A), these functions are less computationally intensive as compared to IF digitization, since in general the digital filters are a lower order. In this embodiment, each sub-array of the phased array antenna includes a receiver channel employing an RF section receiving incident electromagnetic waves 75-2, an IF section, a quadrature down-converter 75-3, a low pass filter 75-4, an analog to digital converter 75-5, a FIR filter 75-6, angle sensing and beam steering functions 75-7, a summation function 75-8 for receiving data sequences from the element channels, and a digital to analog converter 75-9 located at the output. The required phase shift is applied to the IF signal sources passed to the quadrature down converter 70-4. When antenna element channels are phase aligned, angle sensing and beam steering 70-6 is continued to provide accurate beam pointing over time as required by platform dynamics.

Figure 8A:
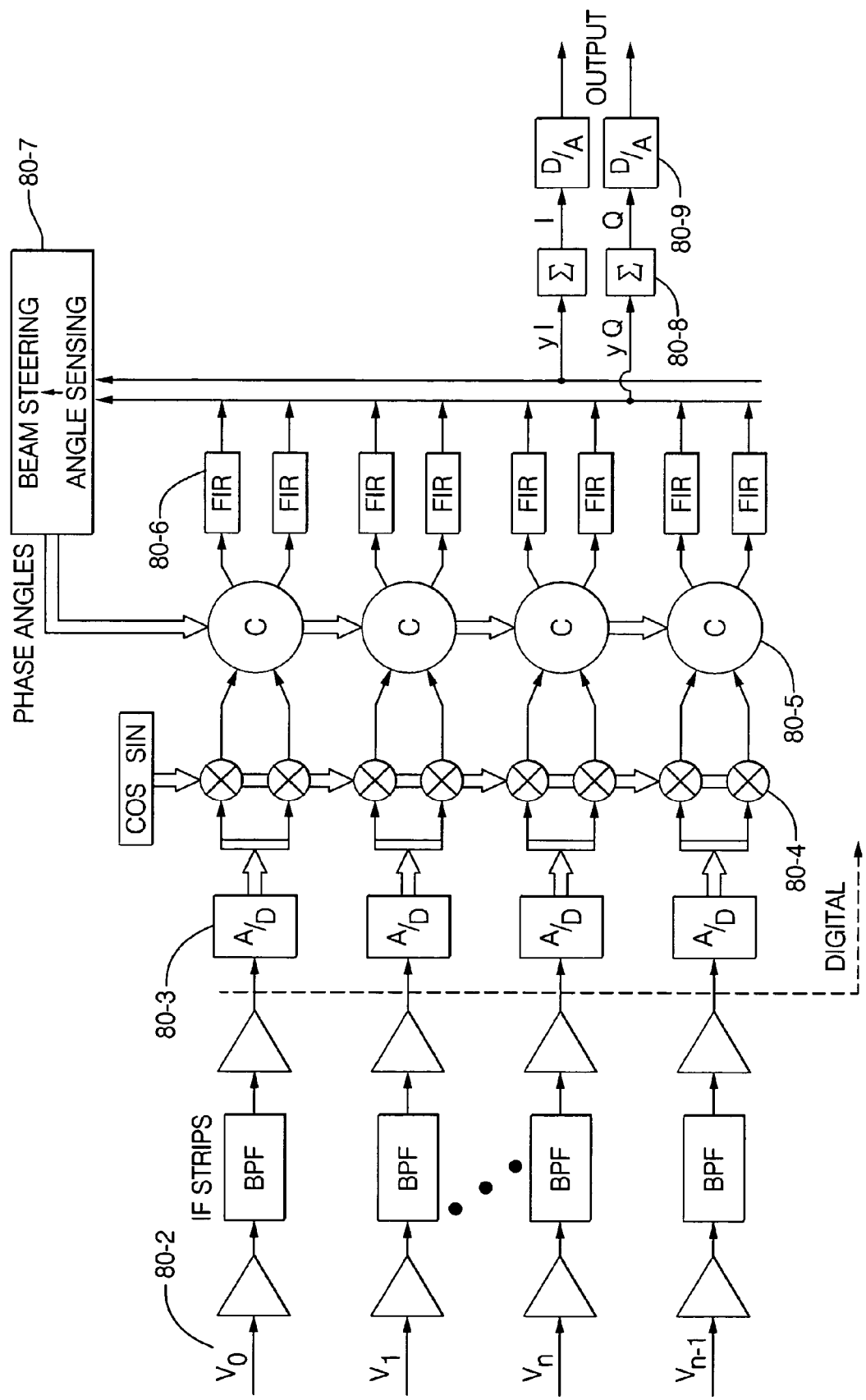
FIG. 8A is a schematic view illustrating beam forming employing the method and system as in FIG. 5B, utilizing IF digitizing with digital quadrature down conversion, in accordance with an embodiment of the present invention.
Figure 8:
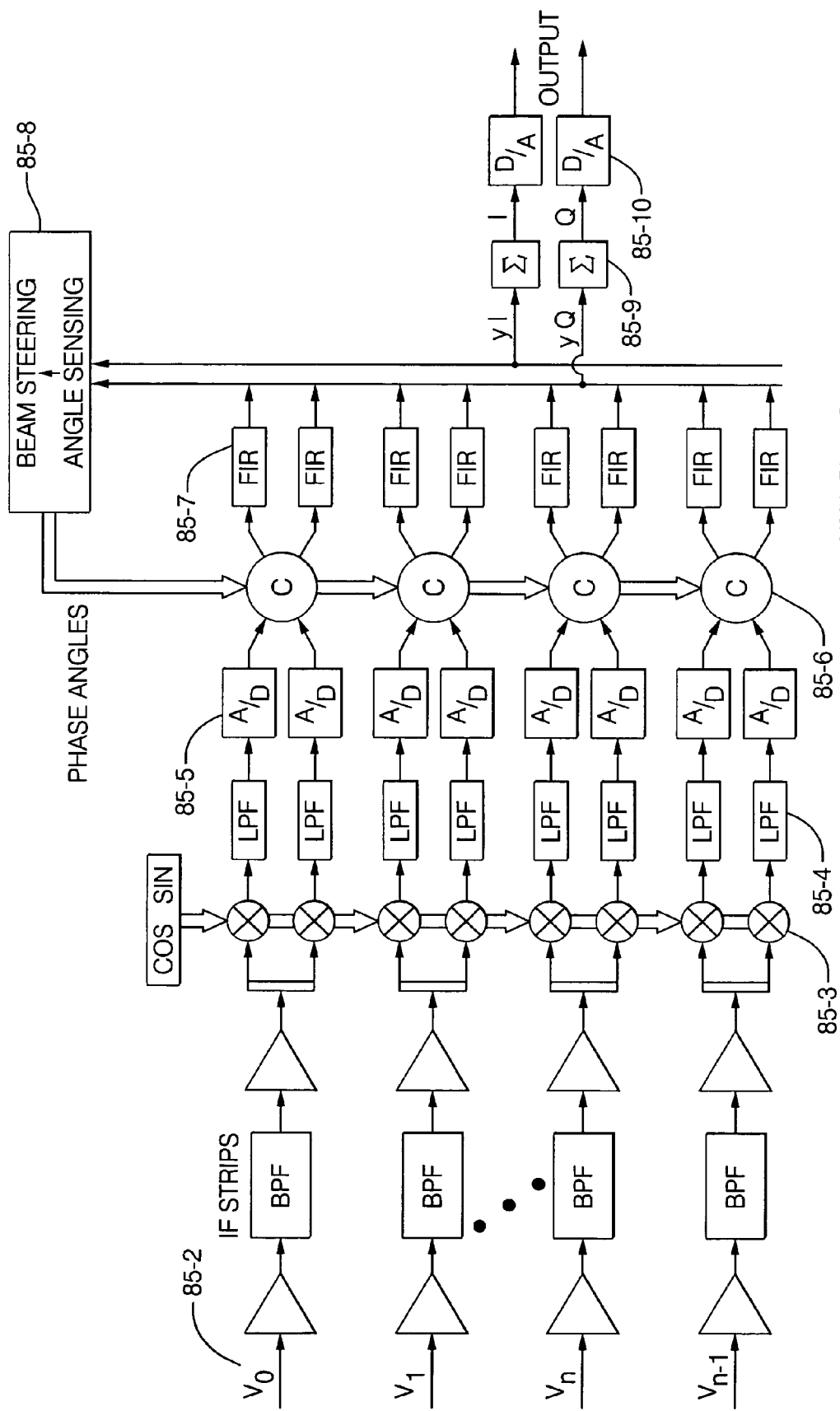
FIG. 8B is a schematic view illustrating beam forming employing the method and system as in FIG. 5B, utilizing baseband digitizing with analog quadrature down conversion, in accordance with an embodiment of the present invention.

FIG. 8A illustrates beam forming employing the method and system as in FIG. 5B, utilizing IF digitizing with digital quadrature down conversion. Each sub-array of the phased array antenna includes a receiver channel employing an RF section receiving incident electromagnetic waves 80-2, an IF section, an analog to digital converter 80-3, a quadrature down-converter 80-4, a complex multiply function 80-5, a FIR filter 80-6, angle sensing and beam steering functions 80-7, a summation function 80-8 for receiving data sequences from the element channels, and a digital to analog converter 80-9 located at the output. The I,Q output from quadrature down converter 80-4 is multiplied by a complex number 80-5 including the required phase shift determined by angle sensing and beam steering functions 80-7. The functions labeled "C" indicate a complex multiply function. When antenna element channels are phase aligned, angle sensing and beam steering 80-7 is continued to provide accurate beam pointing over time as required by platform dynamics.

FIG. 8B illustrates beam forming employing the method and system as in FIG. 5B, utilizing baseband digitizing with analog quadrature down conversion. Each sub-array of the phased array antenna includes a receiver channel employing an RF section receiving incident electromagnetic waves 85-2, an IF section, a quadrature down-converter 85-3, a low pass filter 85-4, an analog to digital converter 85-5, a complex multiply function 85-6, a FIR filter 85-7, angle sensing and beam steering functions 85-8, a summation function 85-9 for receiving data sequences from the element channels, and a digital to analog converter 85-10 located at the output. The I,Q output from quadrature down converter 85-3 is multiplied by a complex number 85-6 including the required phase shift determined by angle sensing and beam steering functions 85-8. When antenna element channels are phase aligned, angle sensing and beam steering 85-8 is continued to provide accurate beam pointing over time as required by platform dynamics.

The method and system shown in FIGS. 7A 7B, 8A and 8B can compute a multiplicity of multi-point FIR filters at each new data sample. As an example, in the DBS system, each FIR filter requires 12 multiply-accumulates in one data sample period: $1/f_s=1/71.1$ MHz=14 nsec. Given large numbers of antenna element channels, i.e. 48 channels requiring 96 filters, the computational load can become great (about $82 \times 10^9$ multiply-accumulates per second), even if modern signal processing integrated circuits are utilized to execute the filters.

Figure 9A:
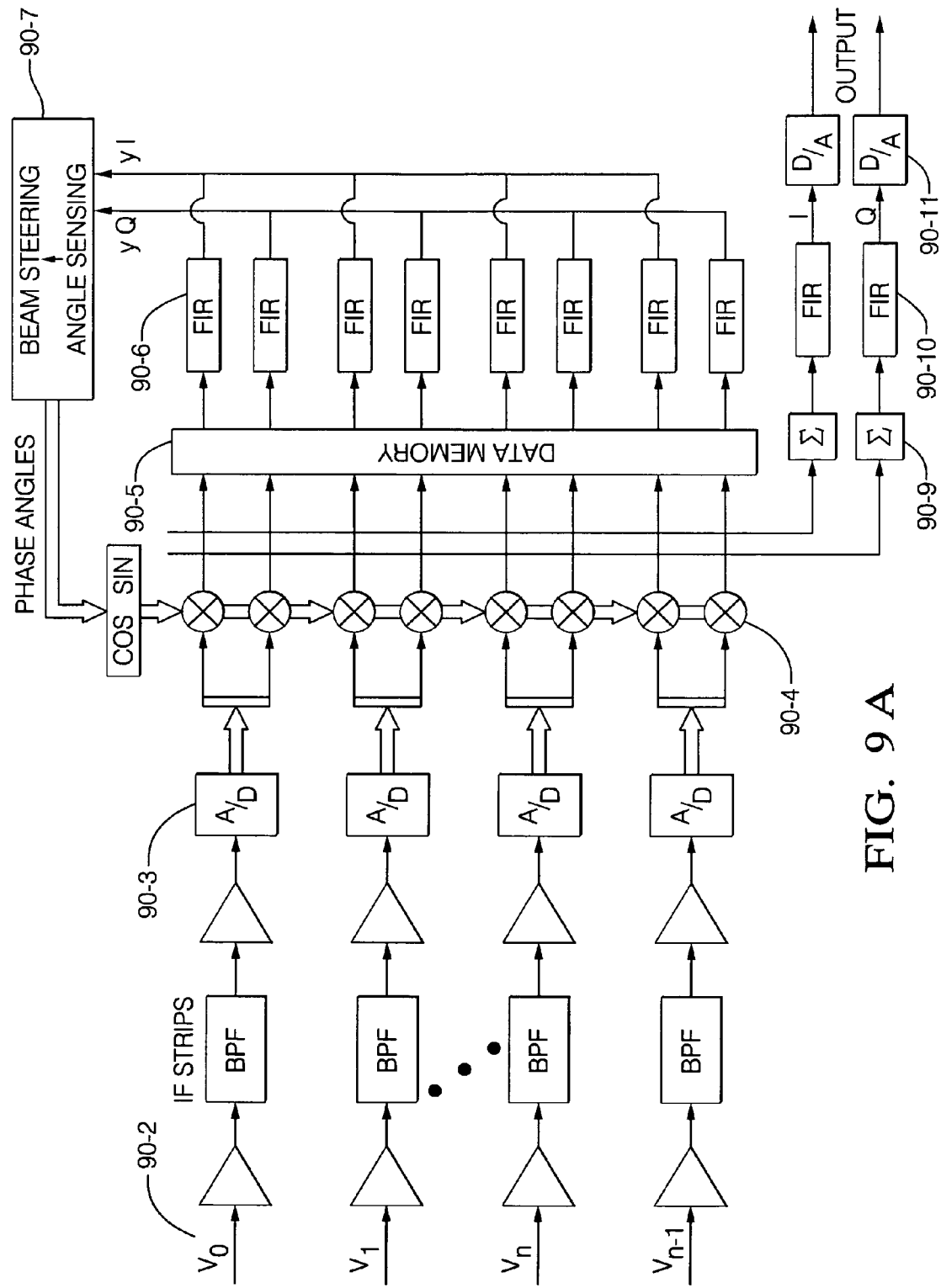
FIG. 9A is a schematic view illustrating the method and system as in FIG. 7A, wherein a schematic branching of summation and filtering to reduce computational load at a data rate is alternatively employed, in accordance with an embodiment of the present invention.
Figure 9:
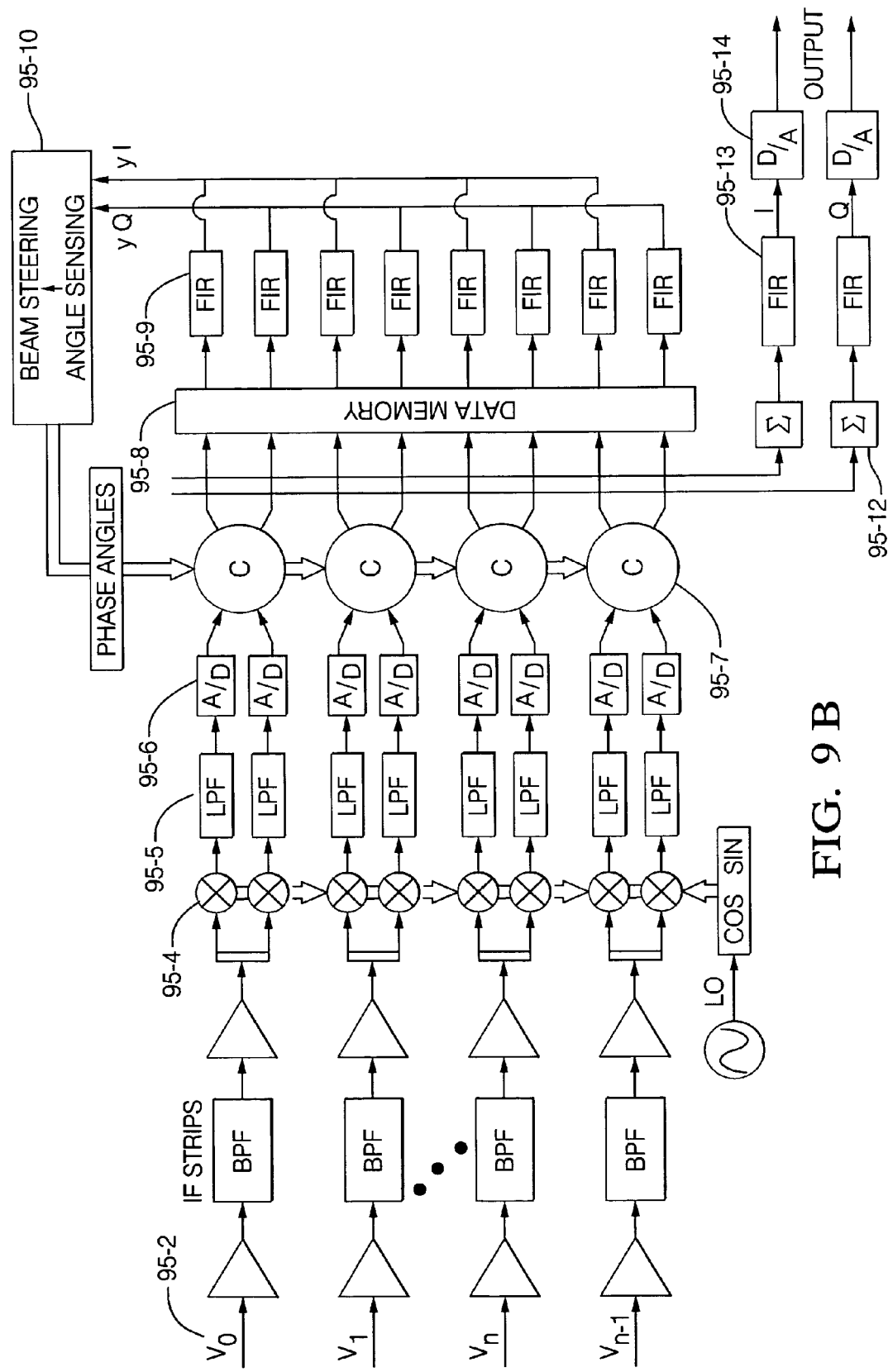
FIG. 9B is a schematic view illustrating the method and system as in FIG. 8B, wherein a schematic branching of summation and filtering to reduce computational load at a data rate is alternatively employed, in accordance with an embodiment of the present invention.

FIG. 9A illustrates a cost effective signal processing method and system for wideband high directivity mobile antenna-receivers. The method and system as in FIG. 7A is utilized, and a schematic branching of summation and filtering to reduce computational load at a data rate is further employed. In comparison to the method and system as in FIGS. 7A 7B, 8A and 8B, the method and system shown in FIGS. 9A and 9B provide an interchanged order of summation and filtering.

In the examples shown, only two FIR filters 90-10 are required to operate at the data rate. In comparison, in the previous design shown in FIG. 7A, all FIR filters are required to operate at the data rate. The FIR filters 90-6 that are not required to operate at the data rate are utilized for beam angle sensing and steering, and can typically operate at orders of magnitude of longer time than the data sample period. An adequately long data sequence from each element channel is stored in data memory 90-5 to fill the digital filter's data base. The filters 90-6 are computed at a rate needed by beam angle correction and search algorithm dynamics. Moreover, the angle of arrival is determined at a rate independent of the data rate. Digital quadrature down-converters 90-4 are used as phase shifters by controlling the reference signal phases as described above. While the quadrature down-converter 90-4 multiplying operations, summation functions 90-9 and filter functions 90-10 occur at the data rate to recover the input data stream, the angle sensing and beam steering 90-7 and associated changes in phase shifts that accomplish beam steering are not required to occur at the data rate.

Each sub-array of the phased array antenna includes a receiver channel employing an RF section receiving incident electromagnetic waves 90-2, an IF section, an analog to digital converter 90-3, a quadrature down-converter 90-4, data memory 90-5, FIR filters 90-6, angle sensing and beam steering functions 90-7, a summation function 90-9 for receiving data sequences from the element channels, FIR filters 90-10, and a digital to analog converter 90-11 located at the output. The required phase shift is applied to the IF signal sources passed to the quadrature down converter 90-4. When antenna element channels are phase aligned, angle sensing and beam steering 90-7 is continued to provide accurate beam pointing over time as required by platform dynamics.

FIG. 9B also illustrates a cost effective signal processing method and system for wideband high directivity mobile antenna-receivers. The method and system as in FIG. 8B is utilized, and a schematic branching of summation and filtering to reduce computational load at a data rate is further employed. Analog down-conversion and baseband sampling is also utilized. Like the design of FIG. 9A, while the summation functions 95-12 and filter functions 95-13 occur at the data rate to recover the input data stream, the angle sensing and beam steering 95-10 and associated changes in phase shifts that accomplish beam steering are not required to occur at the data rate. The filters 95-9 are computed at a rate needed by beam angle correction and search algorithm dynamics.

In this example, each sub-array of the phased array antenna includes a receiver channel employing an RF section receiving incident electromagnetic waves 95-2, an IF section, a quadrature down-converter 95-4, a low pass filter 95-5, an analog to digital converter 95-6, a complex multiply function 95-7, data memory 95-8, FIR filters 95-9, angle sensing and beam steering functions 95-10, a summation function 95-12 for receiving data sequences from the element channels, FIR filters 95-13, and a digital to analog converter 95-14 located at the output. The I,Q output from quadrature down converter 95-4 is multiplied by a complex number 95-7 including the required phase shift determined by angle sensing and beam steering functions 95-10. When antenna element channels are phase aligned, angle sensing and beam steering 95-10 is continued to provide accurate beam pointing over time as required by platform dynamics.

Figure 10:
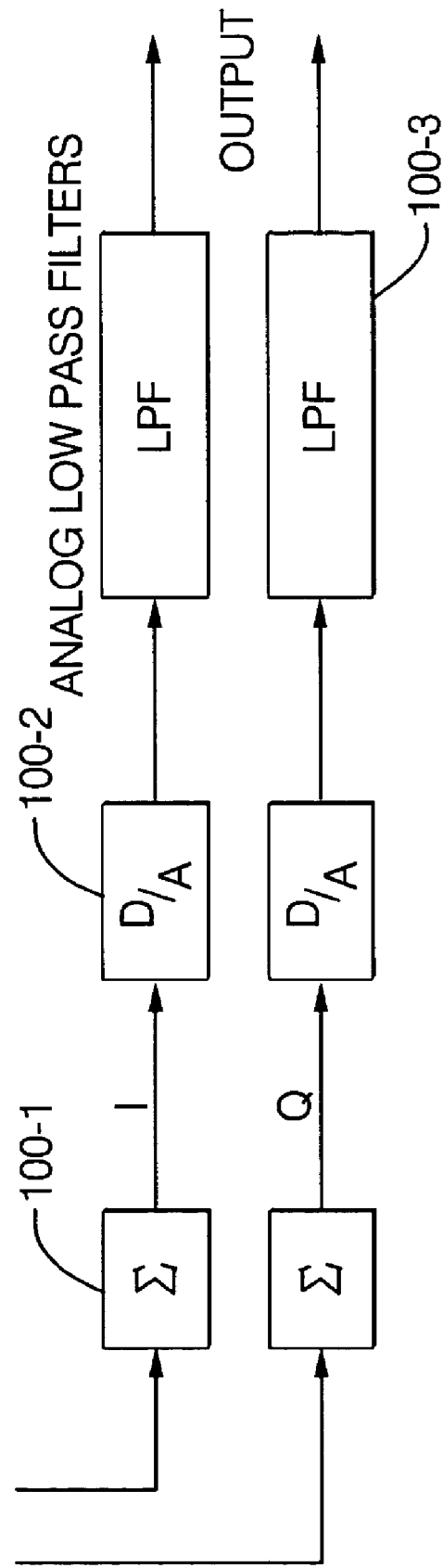
FIG. 10 is a schematic view illustrating a portion of the method and system as in FIGS. 9A and 9B, wherein conversion from digital to analog signals prior to baseband filtering is alternatively employed, in accordance with an embodiment of the present invention.

FIG. 10 illustrates a lower cost alternative embodiment of a portion of the method and system as in FIGS. 9A and 9B, for filtering the baseband at the data rate. Schematically subsequent to a summation function 100-1, a digital signal to analog signal function 100-2 is schematically positioned prior to an analog baseband signal filter 100-3. The analog baseband signal filters 100-3 are a fraction of the cost of a digital implementation for high data rate systems, since these filters must be executed at the data rate.

Multiple Output System

Figure 11:
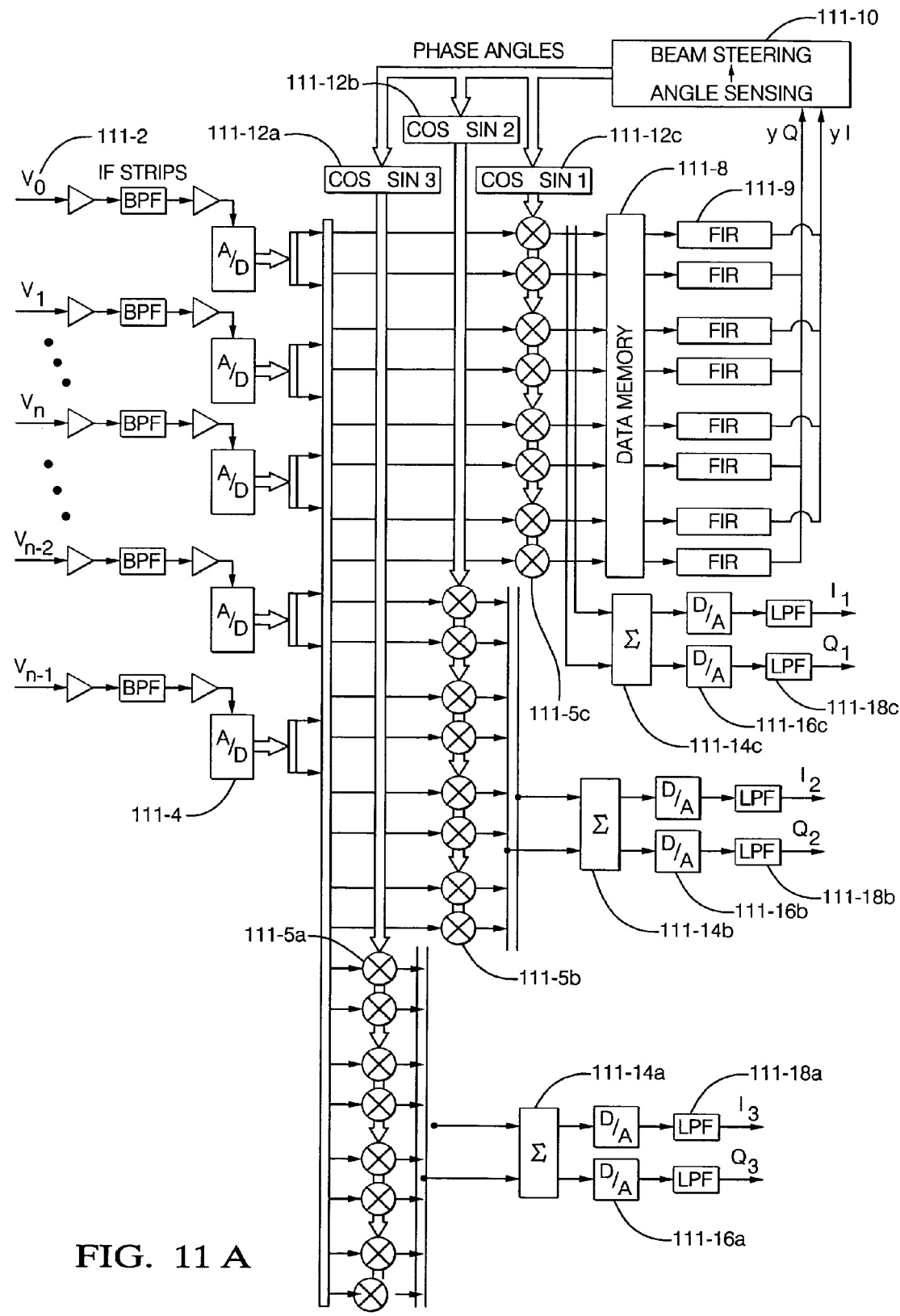
FIG. 11A is a schematic view illustrating the method and system as in FIG. 9A wherein data from each of the element channels is further schematically branched to quadrature down-converter functions dedicated to specific element channels, to simultaneously achieve multiple outputs with the DBF system, supporting the steering and formation of numerous beams simultaneously, in accordance with an embodiment of the present invention.
FIG. 11B is a schematic view illustrating the method and system as in FIG. 9B wherein data from each of the element channels is further schematically branched to complex number multiply functions dedicated to specific element channels, to simultaneously achieve multiple outputs with the DBF system, supporting the steering and formation of numerous beams simultaneously, in accordance with an embodiment of the present invention.
Figure 11:
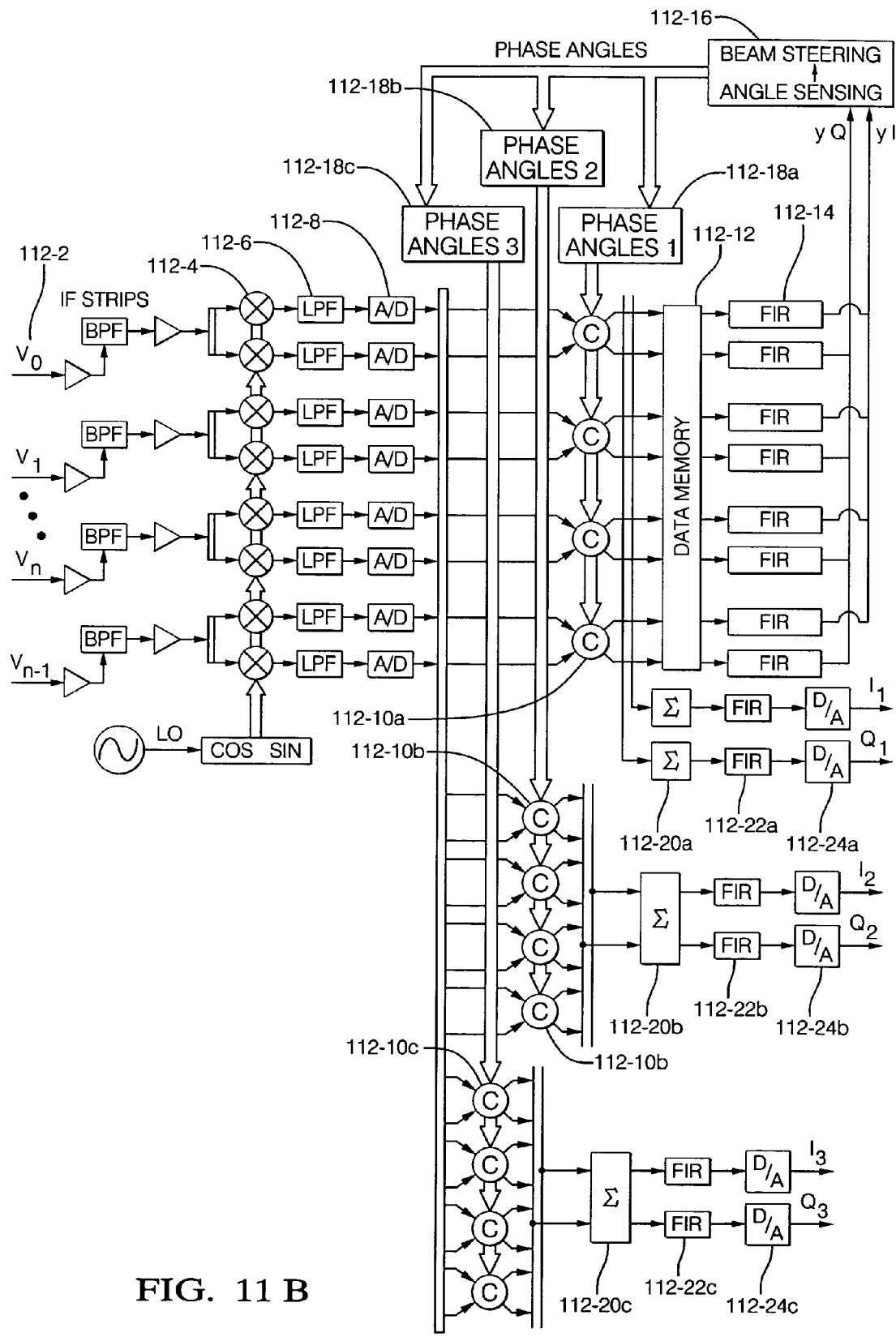

FIG. 11A illustrates the method and system as in FIG. 9A and further shows schematically branched data from each of the element channels to quadrature down-converter functions dedicated to specific element channels. A single array antenna aperture can be used to service a multiplicity of input signals from different directions, some of which can have identical RF frequencies. Beam sensing, beam steering and beam formation of numerous beams is supported simultaneously. Each communication channel can have its own directive beam.

Channel data is separated into a multiple number of quadrature down-converter functions, providing simultaneous multiple outputs. Digital quadrature down-converters 111-5a, 111-5b and 111-5c are used as phase shifters by controlling the reference signal phases as described above. It is to be appreciated that the determined phase angles for different communication channels can vary and as such are shown as inputted phase angles 111-12a, 111-12b and 111-12c. Like previously discussed designs, while the quadrature down-converters 111-5a, 111-5b and 111-5c multiplying operations and summation functions 111-14a, 111-14b and 111-14c occur at the data rate to recover the input data stream, the angle sensing and beam steering 111-10 and associated changes in phase shifts that accomplish beam steering, including FIR filters 111-9, are not required to occur at the data rate.

Each sub-array of the phased array antenna includes a receiver channel employing an RF section receiving incident electromagnetic waves 111-2, an IF section, an analog to digital converter 111-4, quadrature down-converters 111-5a, 111-5b and 111-5c, data memory 111-8, FIR filters 111-9, angle sensing and beam steering functions 111-10, summation functions 111-14a, 111-14b and 111-14c for receiving data sequences from the element channels, digital to analog converters 111-16a, 111-16b and 111-16c, and filters 111-18a, 111-18b and 111-18c located at the respective outputs. The required phase shifts are applied to the IF signal sources passed to the quadrature down converters 11-5a, 111-5b and 111-5c. When antenna element channels are phase aligned, angle sensing and beam steering functions 111-10, as well as the applied phase shifts 111-12a, 111-12b and 111-12c are continued to provide accurate beam forming over time as required by platform dynamics.

FIG. 11B illustrates the method and system as in FIG. 9B and further shows schematically branched data from each of the element channels to complex number multiply functions dedicated to specific element channels. Like the design of FIG. 11A, a single array antenna aperture can be used to service a multiplicity of input signals from different directions, some of which can have identical RF frequencies. Beam sensing, beam steering and beam formation of numerous beams is supported simultaneously. Each communication channel can have its own directive beam.

Channel data is separated into a multiple number of complex number multiply functions, providing simultaneous multiple outputs. Complex number multiply functions 112-10a, 112-10b and 112-10c are used as phase shifters. It is to be appreciated that the determined phase angles for different communication channels can vary and as such are shown as inputted phase angles 112-18a, 112-18b and 112-18c. Like previously discussed designs, while the summation functions 112-20a, 112-20b and 112-20c and filter functions 112-22a, 112-22b and 112-22c occur at the data rate to recover the input data stream, the angle sensing and beam steering functions 112-16 and associated changes in phase shifts that accomplish beam steering, including FIR filters 112-14 are not required to occur at the data rate.

In this example, each sub-array of the phased array antenna includes a receiver channel employing an RF section receiving incident electromagnetic waves 112-2, an IF section, quadrature down-converters 112-4, a low pass filters 112-6, an analog to digital converters 112-8, complex multiply functions 112-10a, 112-10b and 112-10c, data memory 112-12, FIR filters 112-14, angle sensing and beam steering functions 112-16, summation functions 112-20a, 112-20b and 112-20c for receiving data sequences from the element channels, FIR filters 112-22a, 112-22b and 112-22c, and digital to analog converters 112-24a, 112-24b and 112-24c located at the respective output. The I,Q outputs from quadrature down converters 112-4 are multiplied by complex numbers at 112-10a, 112-10b and 112-10c that include the required phase shifts 112-18a, 112-18b and 112-18c determined by angle sensing and beam steering functions 112-16. When antenna element channels are phase aligned, angle sensing and beam steering functions 112-16, as well as the applied phase shifts 112-18a, 112-18b and 112-18c are continued to provide accurate beam forming over time as required by platform dynamics.

Other features and advantages of this invention will be apparent to a person of skill in the art who studies this disclosure. For example, it is to be appreciated that embodiments of the DBF system described herein can be employed to form multiple narrow beams and spatially lock the multiple narrow beams to a multiplicity of far transmitters. Moreover, the partially defocused fat beams can be utilized to receive nearby transmitters. Thus, exemplary embodiments, modifications and variations can be made to the disclosed embodiments while remaining within the spirit and scope of the invention as defined by the appended claims.

What is claimed is:

1. A method for a communications system comprising:
shifting a phase of a quadrature down-converter reference signal utilizing a phase adjustment ($\Psi_n$) to phase shift an antenna element channel baseband signal for phase aligning the antenna element channel;
maximizing a sum of an array coherent summation equation to determine an input signal angle of arrival wherein $\phi_n$ is set equal to $-\Delta\phi_n$ for each antenna element channel, wherein the $\phi_n$ and the $\Delta\phi_n$ are terms from the array coherent summation equation given as $$\sum_{n=0}^{N-1} y_n(t) w_n e^{j\varphi_n} = \sum_{n=0}^{N-1} z(t) e^{j[(\omega_1-\omega_{lo})t+\Delta\phi_n]} w_n e^{j\varphi_n};$$

and
determining the $\phi_n$ that maximizes the array coherent summation equation,
wherein the $\Psi_n$ is set to the input signal angle of arrival values, wherein the $\Psi_n$ is set equal to $\phi_n$.

2. The method as in claim 1, wherein the phase aligning the antenna element channels comprises one of employing intermediate frequency (IF) digitizing with digital quadrature down conversion and baseband digitizing with analog quadrature down conversion.

3. The method as in claim 1, further comprising repeatedly determining the input signal angle of arrival and repeatedly performing the phase aligning for forming an angle tracking feedback loop to maintain a beam pointing at a communication source.

4. The method as in claim 3, further comprising maintaining a 90 degree steered beam boresight angle of phase corrected channels, coincident with a phased array aperture normal vector, to drive the angle tracking feedback loop.

5. The method as in claim 3, further comprising determining an angle of arrival of a beam summation peak by correlation with a reference curve and verifying that a monopulse peak occurs substantially at a same angle as the summation peak, utilizing at least one of monopulse processing, conical scanning, sequential lobing, adaptive-array systems, and switched-beam systems for angle finding.

6. The method as in claim 1, further comprising varying the quadrature down-converter reference signal frequency parameter to mechanize frequency tracking, frequency locking, and phase locking functions.

7. The method as in claim 1, wherein the maximized sum of the coherent summation equation is employed with one of a linear, planar and conformal array, and wherein antenna channel element spacing is one of uniform and nonuniform.

8. A communications system comprising:
a digital beam forming (DBF) signal processing system including one of intermediate frequency (IF) digitizing with digital quadrature down conversion and baseband digitizing with analog quadrature down conversion,
wherein the DBF system includes a first function to maximize a sum of an array coherent summation equation to determine an input signal angle of arrival, wherein $\phi_n$ is set equal to $-\Delta\phi_n$ for each antenna element channel, wherein the $\phi_n$ and the $\Delta\Phi_n$ are terms from the array coherent summation equation given as $$\sum_{n=0}^{N-1} y_n(t) w_n e^{j\varphi_n} = \sum_{n=0}^{N-1} z(t) e^{j[(\omega_1 - \omega_{lo})t + \Delta\phi n]} w_n e^{j\varphi_n};$$

wherein the DBF system includes a second function to determine the $\phi_n$ that maximizes the array coherent summation equation; and
wherein the DBF system includes a third function to phase align the antenna element channels to accomplish beam steering, wherein element channel baseband signals are shifted in phase by shifting a phase of a quadrature down-converter reference signal with a phase adjustment ($\Psi_n$), wherein the $\Psi_n$ is set to the input signal angle of arrival values, wherein the $\phi_n$ is set equal to the $\phi_n$ for phase alignment.

9. The communications system as in claim 8, wherein a summation function for receiving data sequences from the element channels is situated in a first schematic branch and operates at a rate of an incoming data sampling rate, and wherein a baseband filter, an angle sensing function and a beam steering function are situated in a second schematic branch and operate at a rate independent of the incoming data sampling rate.

10. The communications system as in claim 9, wherein schematically subsequent to the summation function, along the first schematic branch, a digital signal to analog signal function is schematically positioned prior to a baseband signal filter.

11. The communications system as in claim 9, wherein the element channels are present in a multiple number and share an antenna aperture, wherein each of the element channels maintain a dedicated directive beam, and wherein data from each of the element channels is schematically branched to one of quadrature down-converter functions and complex number multiply functions, dedicated to specific element channels, to simultaneously achieve multiple outputs with the DBF system.

12. The communications system as in claim 9, wherein the DBF system forms multiple narrow beams and spatially locks the multiple narrow beams to a multiplicity of far transmitters, and utilizes partially defocused fat beams to receive nearby transmitters.

13. A method of digital beam forming for a communications system comprising:
maximizing a sum of an array coherent summation equation to determine an input signal angle of arrival wherein $\phi_n$ is set equal to $-\Delta\phi_n$ for each antenna element channel, wherein the $\phi_n$ and the $\Delta\phi_n$ are terms from the array coherent summation equation given as $$\sum_{n=0}^{N-1} y_n(t) w_n e^{j\varphi_n} = \sum_{n=0}^{N-1} z(t) e^{j[(\omega_1 - \omega_{lo})t + \Delta\phi n]} w_n e^{j\varphi_n};$$

determining the $\phi_n$ that maximizes the array coherent summation equation;
phase aligning the antenna element channels to accomplish beam steering, wherein element channel baseband signals are shifted in phase by multiplying an in-phase/quadrature modulator (I/Q) output by a complex number having a modulus equal to one, the complex number having a required phase shift $\Psi_n$ as a phase, wherein the $\Psi_n$ is set to the input signal angle of arrival values, wherein the $\Psi_n$ is set equal to the $\phi_n$ for phase alignment; and
situating a summation function for receiving data sequences from element channels in a first schematic branch to operate at a rate of an incoming data sampling rate, and situating a baseband filter, an angle sensing function and a beam steering function in a second schematic branch to operate at a rate independent of the incoming data sampling rate.

14. The method as in claim 13, further comprising performing conversion from a digital signal to analog signal, along the first schematic branch, schematically subsequent to utilizing the summation function and schematically prior to baseband signal filtering.

15. The method as in claim 13, further comprising schematically branching data from each of the element channels to one, of quadrature down-converter functions and complex number multiply functions, dedicated to specific element channels, to simultaneously achieve multiple outputs with a DBF system architecture, and setting multiple element channels to share an antenna aperture, each of the channels having a dedicated directive beam.

16. The method as in claim 13, further comprising forming multiple narrow beams and spatially locking the multiple narrow beams to a multiplicity of far transmitters, and utilizing partially defocused fat beams to receive nearby transmitters.

17. The method as in claim 13, wherein the phase aligning the antenna element channels comprises employing intermediate frequency (IF) digitizing with digital quadrature down conversion.

18. The method as in claim 13, wherein the phase aligning the antenna element channels comprises employing baseband digitizing with analog quadrature down conversion.

19. A method for a communications system comprising:
shifting a phase of a quadrature down-converter reference signal utilizing a phase adjustment ($\Psi_n$) to phase shift an antenna element channel baseband signal for phase aligning the antenna element channel;
situating a summation function for receiving data sequences from the element channel in a first schematic branch to operate at a rate of an incoming data sampling rate; and
situating a baseband filter, an angle sensing function and a beam steering function in a second schematic branch to operate at a rate independent of the incoming data sampling rate.

20. The method as in claim 19, wherein the phase aligning the antenna element channels comprises one of employing intermediate frequency (IF) digitizing with digital quadrature down conversion and baseband digitizing with analog quadrature down conversion.

21. The method as in claim 19, further comprising varying the quadrature down-converter reference signal frequency parameter to mechanize frequency tracking, frequency locking, and phase locking functions.

* * * * *